(12) United States Patent
Williams et al.

(10) Patent No.: US 8,064,953 B2
(45) Date of Patent: *Nov. 22, 2011

(54) METHODS AND APPARATUS FOR TRANSMITTING POWER AND DATA USING THE HUMAN BODY

(75) Inventors: Lyndsay Williams, Cambridge (GB); William Vablais, Woodinville, WA (US); Steven N. Bathiche, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 227 days.

This patent is subject to a terminal disclaimer.

(21) Appl. No.: 12/356,477

(22) Filed: Jan. 20, 2009

(65) Prior Publication Data

US 2009/0191824 A1    Jul. 30, 2009

Related U.S. Application Data

(63) Continuation of application No. 10/833,919, filed on Apr. 28, 2004, now Pat. No. 7,480,492, which is a continuation of application No. 09/559,746, filed on Apr. 27, 2000, now Pat. No. 6,754,472.

(51) Int. Cl.
    *H04M 1/00* (2006.01)

(52) U.S. Cl. .................. 455/556.1; 455/556.2; 455/557; 455/100

(58) Field of Classification Search .................. 381/312, 381/315, 322, 326, 151; 607/59, 60, 32; 455/95, 100, 41.2, 106, 556.1, 556.2, 557; 128/662.03; 73/629, 627

See application file for complete search history.

(56) References Cited

U.S. PATENT DOCUMENTS

| 4,755,816 A | 7/1988 | DeLuca |
| 5,796,827 A | 8/1998 | Coppersmith et al. |
| 5,811,897 A | 9/1998 | Spaude et al. |
| 6,104,193 A | 8/2000 | Bell |
| 6,118,882 A | 9/2000 | Haynes |
| 6,154,422 A | 11/2000 | Shinkawa et al. |
| 6,211,799 B1 | 4/2001 | Post et al. |

(Continued)

OTHER PUBLICATIONS

"Bio Analogics Technology Resources" downloaded from http://www.bioanalogics.com/technology.htm on Apr. 26, 2000, 2 pages.
"Bio Analogics Technology—Body Composition Techniques" downloaded from http://www.bioanalogics.com/tehcniques.htm on Apr. 26, 2000, 6 pages.
"The Official Bluetooth SIG Website—Text", INTRO downloaded from http://www.bluetooth.com/text/bluetoothguide/intro/intro.asp on Apr. 26, 2000, 1 page.

(Continued)

*Primary Examiner* — Jean Gelin
(74) *Attorney, Agent, or Firm* — Lee & Hayes, PLLC (57) ABSTRACT

Methods and apparatus for distributing power and data to devices coupled to the human body are described. The human body is used as a conductive medium, e.g., a bus, over which power and/or data is distributed. Power is distributed by coupling a power source to the human body via a first set of electrodes. One or more devices to be powered, e.g., peripheral devices, are also coupled to the human body via additional sets of electrodes. The devices may be, e.g., a speaker, display, watch, keyboard, etc. A pulsed DC signal or AC signal may be used as the power source. By using multiple power supply signals of differing frequencies, different devices can be selectively 15 powered. For example, a 100 Hz signal may be used to power a first device while a 150 Hz signal may be used to power a second device. Digital data and/or other information signals, e.g., audio signals, can be modulated on the power signal using frequency and/or amplitude modulation techniques. The power source and peripheral devices can interact to form a complete computer network where the body serves as the bus coupling the devices together. Devices can include optional batteries, one or more CPUs, transmit/receive circuitry, and/or input/output circuitry. In one particular exemplary network implementation the first device to be placed on the body operates as a master device, e.g., bus master, with one or more subsequently added devices working as slaves.

32 Claims, 6 Drawing Sheets

U.S. PATENT DOCUMENTS

| | | | |
|---|---|---|---|
| 6,223,018 B1 | 4/2001 | Fukumoto et al. | |
| 6,282,407 B1 | 8/2001 | Vega et al. | |
| 6,400,359 B1 | 6/2002 | Katabami | |
| 6,424,820 B1 | 7/2002 | Burdick et al. | |
| 6,992,565 B1 | 1/2006 | Giesler | |
| 2002/0013527 A1* | 1/2002 | Hoek et al. | 600/437 |

OTHER PUBLICATIONS

"The Official Bluetooth SIG Website—Text, Mobile Phone" Bluetooth Introduction downloaded from http://www.bluetooth.com/text/bluetoothguide/intro/intro.asp? action=bt4u&sort=mobphone on Apr. 26, 2000, 1 page.

"Wireless connections made easy" Specification of the Bluetooth System, Specification vol. 1, Core, Dec. 1, 1999, pp. 1-32.

"Popular Mechanics Technology Watch: Walking Powers Electronics" downloaded from http://popularmechanics.com/popmech/sci/tech/9903TUEEDM.html on Apr. 26, 2000, 1 page, Mar. 1999.

"Personal Area Networks: Near-field intrabody communication" IBM Systems Journal, vol. 35, No. 3 & 4, 1996—MIT Media Lab, 11 pages.

\* cited by examiner

METHODS AND APPARATUS FOR TRANSMITTING POWER AND DATA USING THE HUMAN BODY

CROSS-REFERENCE TO RELATED APPLICATIONS

This application is a continuation of U.S. patent application Ser. No. 10/833,919, filed on Apr. 28, 2004, which itself is a continuation of U.S. patent application Ser. No. 09/559,746, filed on Apr. 27, 2000, and entitled "METHODS AND APPARATUS FOR TRANSMITTING POWER AND DATA USING THE HUMAN BODY." The entirety of the above-noted applications is incorporated herein by reference.

FIELD OF THE INVENTION

The present invention relates to methods and apparatus for transmitting power and data, and more particularly, to methods of powering devices coupled to the human body and communication information between the devices.

BACKGROUND OF THE INVENTION

Small portable electronic devices are commonplace today. Small portable devices commonly used by people today include wristwatches, radios, communications devices, e.g., pagers and cell phones, and 20 personal data assistants (PDAs) to name but a few exemplary devices. As electronics manufacturing techniques have improved, weight and power consumption requirements of many small portable devices have decreased. At the same time, the capabilities of the devices have increased. As a result, it is now possible to power many small electronic devices including watches, audio players, personal data assistants, portable computers, etc. with relatively little power.

Given the small size and portable nature of many of today's portable electronic devices, people have begun wearing them on their bodies. For example, wristwatches are worn on people's arms, pagers and PDAs are worn on people's belts, and small displays are sometimes worn mounted on headgear.

As a result of carrying multiple portable electronic devices, there is often a significant amount of redundancy in terms of input/output devices included in the portable devices used by a single person. For example, a watch, pager, PDA and radio may all include a speaker. In order to reduce the redundancy in input/output devices, networking of portable electronic devices has been proposed. By exchanging data, e.g., as part of a network, a single data input or output device can be used by multiple portable devices, eliminating the need for each of the portable devices to have the same input/output device.

Various approaches have been taken in an attempt to network portable devices. The uses of radio (RF) signals, infrared (IR) communications signals, and near field intrabody communication signals are examples of various signals that have been suggested for use in networking portable devices. Radio signals between devices can cause interference. In addition radio devices can be expensive to implement and tend to consume relatively large amounts of power. In addition, decoding another person's transmitted information and controlling another person's device is plausible using RF, raising the concern for security and privacy. IR communications signals present similar privacy concerns to those of RF signals while further being subject to additional limitations in terms of the tendency for many objects, e.g., opaque objects, to block the transmission of IR signals. Near field intrabody communication signals represent a relatively new and still largely undeveloped field of signal communications.

In the case of one near field intrabody communications system, information is exchanged between electronic devices on or near the human body by capacitively coupling picoamp currents through the human body of a person.

While some work has been done to minimize the redundancy that exists in data input/output devices, in portable devices frequently used by a single individual, there still remains room for improvements in the way information is communicated between portable devices. In addition, some wearable devices are not big enough to have any kind of interface at all; e.g. earrings.

There remains significant room for improvement with regard to how portable devices are powered. Portable electronic devices frequently rely on power supplied by batteries to operate. Batteries have a limited energy storage capability. As a result, batteries periodically need to be replaced or, assuming they are rechargeable, recharged. The need to replace or recharge batteries posses a serious limitation on known portable battery powered devices. Battery replacement normally involves physically removing a current set of batteries and replacing them with a new set of batteries. Recharging of batteries normally involves plugging the portable device into a battery charger thereby limiting the devices portability until the re-charging is complete or, alternatively, swapping a charged battery pack for a battery pack including the batteries, which need to be recharged.

The swapping of battery packs, replacement of batteries, and/or recharging of batteries by plugging in a portable device represents an inconvenience in terms of time involved with a user performing a battery replacement operation or recharging operation. In many cases it also represents an interruption in service, i.e., often during the battery swapping or recharging operation, the device cannot be used or its portability is limited.

Until the present invention, the focus with regard to portable device power issues has been largely on improving the quality of batteries, reducing the amount of power required by a portable device to operate, and/or in providing backup power sources, e.g., to permit the swapping of batteries without causing an interruption in operation.

While recent improvements in batteries and device power consumption has increased the amount of time portable devices can operate before needing the batteries to be recharged or replaced, the need to periodically recharge or replace batteries in portable devices remains an area where improvements can be made. In particular, there is a need for making recharging of batteries easier to perform, preferably without requiring an interruption in device operation or for backup batteries inside the device. There is also a need for eliminating batteries in at least some portable devices, thereby reducing the weight of the portable devices making them easier to wear for extended periods of time.

SUMMARY OF THE PRESENT INVENTION

The present invention is directed to methods and apparatus for distributing power to devices coupled to the human body. The invention is also directed to methods and apparatus for communicating information, e.g., data and control signals, to devices coupled to the human body.

In accordance with the present invention the human body is used as a conductive medium, e.g., a bus, over which power is distributed. Information, e.g., data and control signals, may also be distributed over the human body in accordance with the present invention. To avoid the need for digital circuitry, e.g., in audio output devices, some of the communicated signals may be analog signals. For example, analog audio signals may be transmitted to a speaker using the human body as the communications media by which the audio signal is transmitted.

In accordance with the invention, power is distributed by coupling a power source to the human body via a first set of electrodes. One or more devices to be powered, e.g., peripheral devices, are also coupled to the human body via additional sets of electrodes. The devices may be, e.g., a speaker, display, watch, keyboard, etc. A pulsed DC signal or AC signal may be used as the power source. By using multiple power supply signals of differing frequencies, different devices can be selectively powered. For example, a 100 Hz signal may be used to power a first device while a 150 Hz signal may be used to power a second device. Digital data and/or other information signals, e.g., audio signals, can be modulated on the power signal using frequency and/or amplitude modulation techniques. The power source and peripheral devices can interact to form a complete computer network where the body serves as the bus coupling the devices together. Devices can include optional batteries, one or more CPUs, transmit/receive circuitry, and/or input/output circuitry. In one particular exemplary network implementation the first device to be placed on the body operates as a master device, e.g., bus master, with subsequently added devices working as slaves. In accordance with the invention power and/or communication signals may also be transmitted from one body to another by touch.

The proposed methods of the present invention enable the use of a whole new class of wearable devices. These devices do not have a direct interface, but are instead used as relays for collecting and transmitting information to the user. For example earrings, which can be used to measure the persons pulse rate or even deliver sound to the ear via a phone worn on the person's belt. To program the earring directly would be a quite cumbersome task; however, the earrings parameters could be set via another device that is large enough and has the appropriate user interface to enter data. The user could use this device to control the volume of the earrings or to control other function of this device. This concept could be extended to many other such devices that are worn on the body: jewelry, watches, and eyeglasses to name a few.

Because the devices of the present invention are networked, they can be recharged and powered by other devices on the network. Kinetic to power converters can be used in this network to sustain this network's power. Kinetic converters in shoes and on wrist watches can be used to convert the kinetic energy of the user to electrical power and distribute that power to the rest of the network. This is yet another property that distinguishes devices of the present invention from other networks such as RF or IR.

Numerous additional features and advantages of the present invention will be discussed in the detailed description, which follows.

DETAILED DESCRIPTION

As discussed above, the present invention is directed to methods and apparatus for distributing power to devices coupled to the human body. The invention is a to methods and apparatus for communicating information, e.g., data and control signals, to devices coupled to the human body.

Figure 1:
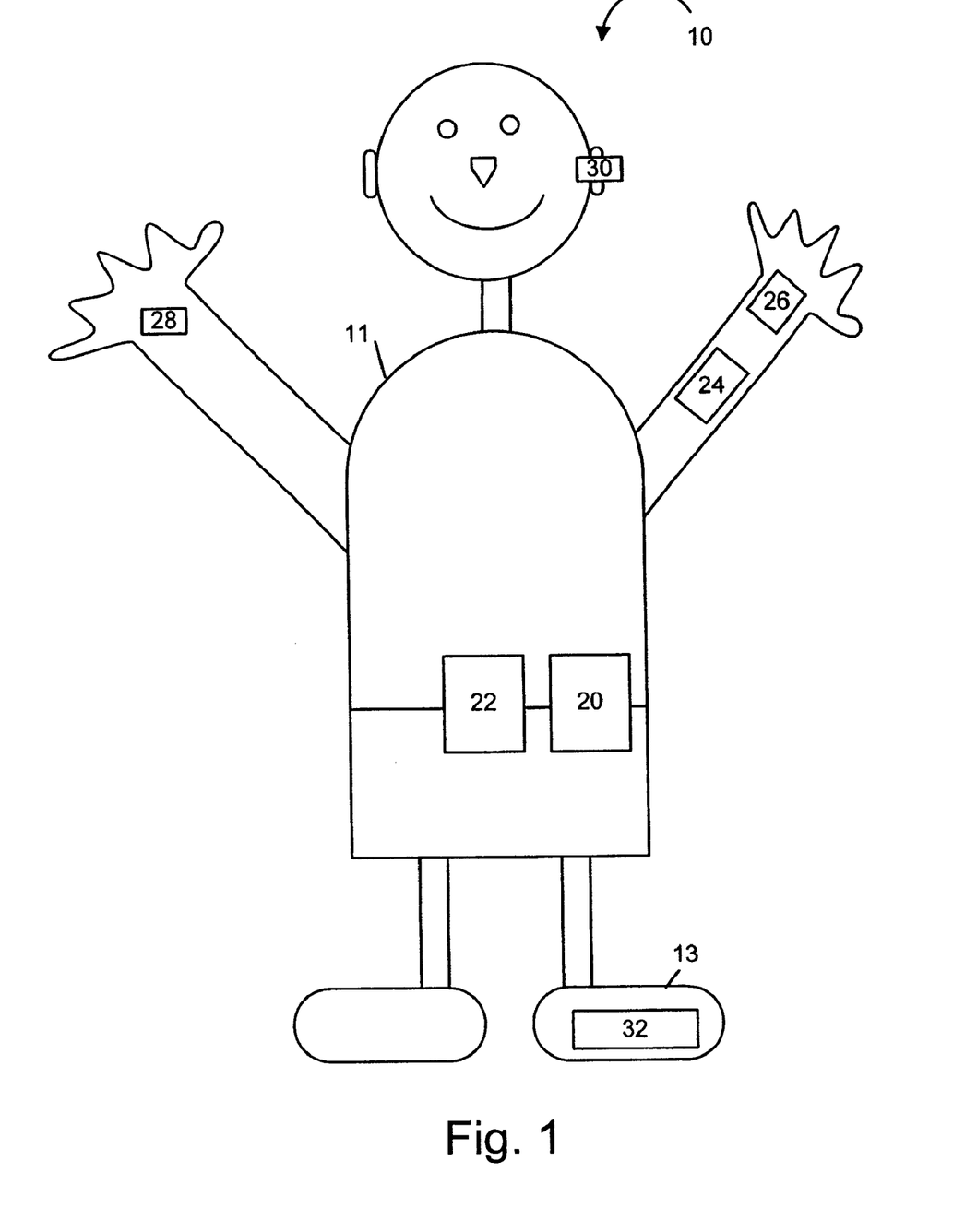
FIG. 1 illustrates an exemplary system of the present invention wherein the body of a person is used as a bus for distributing power and information between various devices coupled to the person's body.

FIG. 1 illustrates a system 10 implemented in accordance with the present invention. The system 10 comprises a plurality of portable devices 20, 22, 24, 26, 28, 32, and 30, which are coupled together by the human body 11. The portable devices include a portable computer device 20, a pager device 22, a keyboard 24, a display 26, an audio input device 28, an audio playback device 30 and a power supply 32. Each of the devices is coupled to the human body by a pair of electrodes. Normally, the electrodes are placed in physical contact with the skin with some space between each of the electrodes in an electrode pair.

Power and/or information may be transmitted between the portable devices 20, 22, 24, 26, 28, 32, and 30 by using the body 11 as a conductive medium. Communicated signals may include analog as well as digital signals. Analog signals can be particularly useful for communicating audio information, e.g., to audio playback device 30. As will be discussed below, audio playback device 30 may be implemented as a piezo electric speaker which can directly convert received audio frequency signal into acoustic audio signals.

As illustrated in FIG. 1, portable devices implemented in accordance with the present invention can be mounted on the body in a wide range of locations. They can be implemented so as to appear as common objects if desired.

Portable computer device 20 is shown mounted on the waist. The portable computer device 20 can be implemented as a common personal data assistant (PDA) if desired. Pager device 22 is also shown as a waist mounted device. Given the common wearing of pagers on the waist pager 22 can be designed to appear as an ordinary pager device.

Audio playback device 30 is shown mounted in an ear. Alternatively, it can be mounted on the skin near the ear or on another portion of the body. Thus, audio playback device 30 can be designed to take on the appearance of a modern hearing aid.

Keyboard 24 is shown being mounted on the arm. This position makes it easy to reach by the hand on the other arm. It can also be easily concealed by a shirt cuff or sleeve. Display device 26 is conveniently mounted on the wrist. Display device 26 can be implemented using an LCD and mounted in a housing with a wristband. The housing may be similar in size and shape to common watch housings in use today. In this manner display device 26 can be made to appear as an ordinary watch if desired. Audio input device 28, which includes, e.g., a microphone, is also implemented as a wrist mounted device in the FIG. 1 embodiment. The audio input device 28 may be implemented as part of, e.g., a bracelet, if desired.

Power supply 32 is shown mounted on foot 13. The power supply can be mounted in the sole of a pair of shoes or a boot. Accordingly, power supply 32 can also be implemented in an easy to conceal manner. The weight associated with batteries used in a power supply designed to power multiple devices can make the feet or waist good locations for mounting power supply devices. In a foot mounted implementation, a mere change of footwear can serve to replace the power source for the various devices 20, 22, 24, 26, 28, 30.

In accordance with the present invention, the portable devices mounted on a person's body interact to form a complete personal network. Such a network, and the devices which make up the network, will now be discussed in further detail with regard to FIG. 2.

Figure 2:
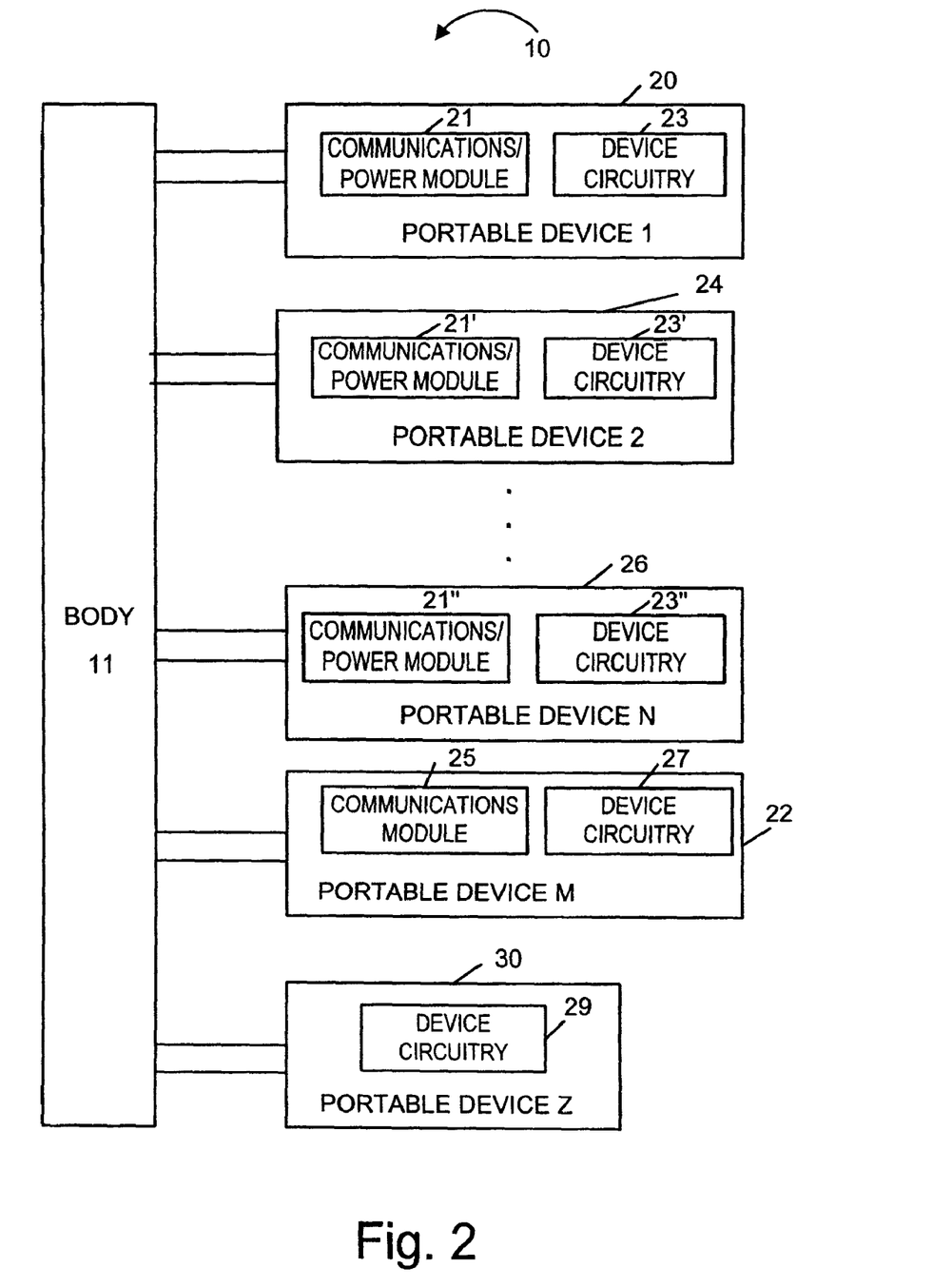
FIG. 2 is a block diagram illustration of the exemplary system illustrated in FIG. 1.

As illustrated in FIG. 2, body 11 serves as a bus to couple portable devices 20, 22, 24, 26, and 30 together. Portable devices, in accordance with the present invention, can transmit and receive power and transmit and receive information, e.g., communications signals. For cost reasons, it may be desirable to implement some devices with a limited subset of these capabilities. For example, it may be cost effective to design an audio device so that it only receives information signals. Alternatively, it may be desirable to implement a device that can draw power from the bus 11 but otherwise not interact with the other devices in the network.

In FIG. 2, the first through Nth portable devices, e.g., devices 20, 24, 26, each include a communications/power module 21, 21', 21" and device circuitry 23, 23', 23". Communications/power module 21 is responsible for interfacing with other devices in the network 10, communicating with them, and receiving/sending power over the bus 11. Device circuitry 23, 23', 23" is circuitry which implements the specific functions the portable devices 20, 24, 26 are designed to support. By segmenting the communications/power functions from the other device functions a standard communications/power module can be designed to support many different types of device circuitry. Furthermore, the device circuitry manufacturer can be isolated from issues relating to the design of the communications/power module. A device interface can thus be standardized with the device circuitry manufacturers merely having to comply with the interface requirements without concerning themselves with the manner in which power is ultimately supplied or the manner in which signals are communicated over the bus 11.

Portable device M 22, e.g., a pager device, is an example of a device which can be implemented so that it does not support the receipt or transmission of power signals over the network but which includes a communications module 25 for communicating information over the bus 11. Device circuitry 27 may include a power source, e.g., battery or solar cell, for powering the portable device M.

Portable device Z, e.g., audio output device 30, is an example of a network device that is capable of receiving signals and using the received signals without communications/power module. Device circuitry 29 may be a piezo electric speaker with leads coupled directly to the bus 11. Electrical signals, e.g., audio frequency signals, transmitted over the bus 11 are converted directly into acoustic audio signals by the piezo electric element of speaker 30 without the need for additional interface circuitry. Thus, speaker 30 can be implemented as a very small device, having very little weight. Audio frequency signals may be transmitted to the speaker 30 as analog as opposed to digital signals.

Figure 3:
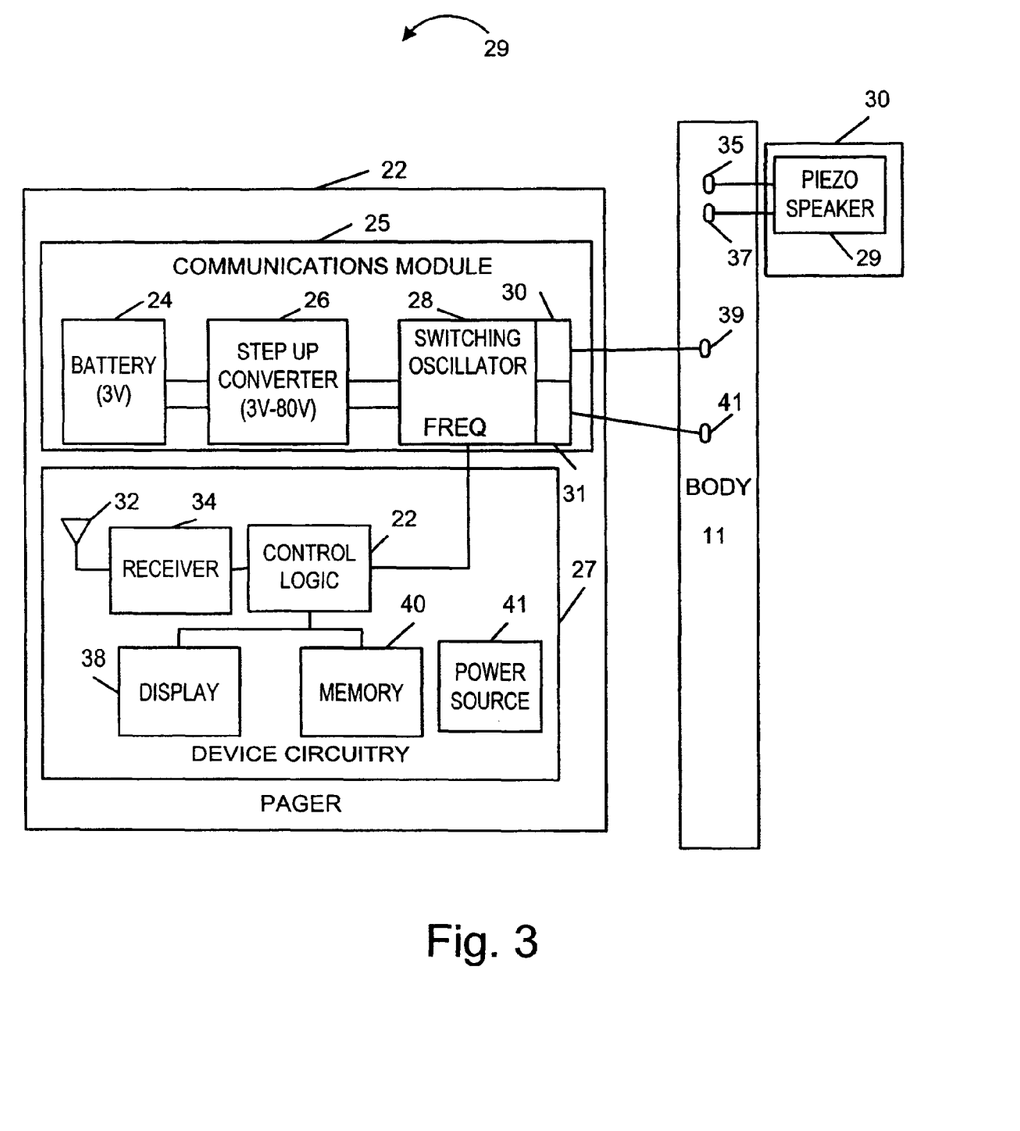
FIG. 3 illustrates two of the devices shown in FIG. 2 in greater detail.

FIG. 3 illustrates a portion 29, of the system 10, that includes the portable pager 25 and audio output device 30. The system portion 29 illustrates how information, e.g., audio signals, can be communicated to an audio playback device 30, which does not include an internal power source, over the body 11.

In FIG. 3, the audio playback device 30 comprises a piezo electric speaker 29, coupled to bus 11, via two electrodes 35, 37.

The pager device 22 comprises a communications module 25 and device circuitry 27. The communications model 25 includes a battery 24, step up converter 26, and switching oscillator 28. The battery 24 serves as a power source for the communications module 25. The battery 24 may be, e.g., a small watch type battery with a relatively low output voltage, e.g., 1-5 volts. Step up converter 26 is used to step up the voltage provided by battery 24 to a level that is high enough to be used to transmit signals over the body 11. In the illustrated example, a 3V signal is stepped up to 80 volts. The 80 volt signal is supplied to the input of switching oscillator 28. The switching oscillator 28 outputs, depending on the embodiment, either a square wave signal or sinusoidal signal, having a frequency determined by a frequency control input signal. In the FIG. 3 embodiment, the frequency range of the oscillator 28 corresponds to a part of the audible frequency range. The frequency control input is supplied by pager device circuitry 27.

The pager device circuitry 27 includes an antenna 32, a receiver 34, control logic 22, a display 38, memory 40, and a power source, e.g., battery 41. In various implementations, the same battery 41 or 24 is used to power both the communications module 25 and device circuitry 27.

The pager 22 receives messages, e.g., telephone numbers and/or other short text messages via antenna 32. The signals received by the antenna 32 are filtered and demodulated/decoded by receiver 34. The messages are then supplied to control logic 22. Control logic 22 may be implemented, e.g., as a CPU operating under instructions, e.g., control routines, stored in memory 40. Memory 40 may also include a pager number used to identify messages corresponding to the particular pager device.

When the control logic receives a message which includes the pager number stored in memory 40, it displays the message, e.g., telephone number, on display 38. In addition, or alternatively, it sends a signal to switching oscillator 28 causing the oscillator 28 to output one or more audio signals. The audio signals generated by oscillator 28 may simply be a tone indicating the receipt of a message or, alternatively, an audio version of the message. The electrical signals generated by switching oscillator 28 are supplied to the body 11 via output transistors 30, 31 and electrodes 39, 41.

Figure 4:
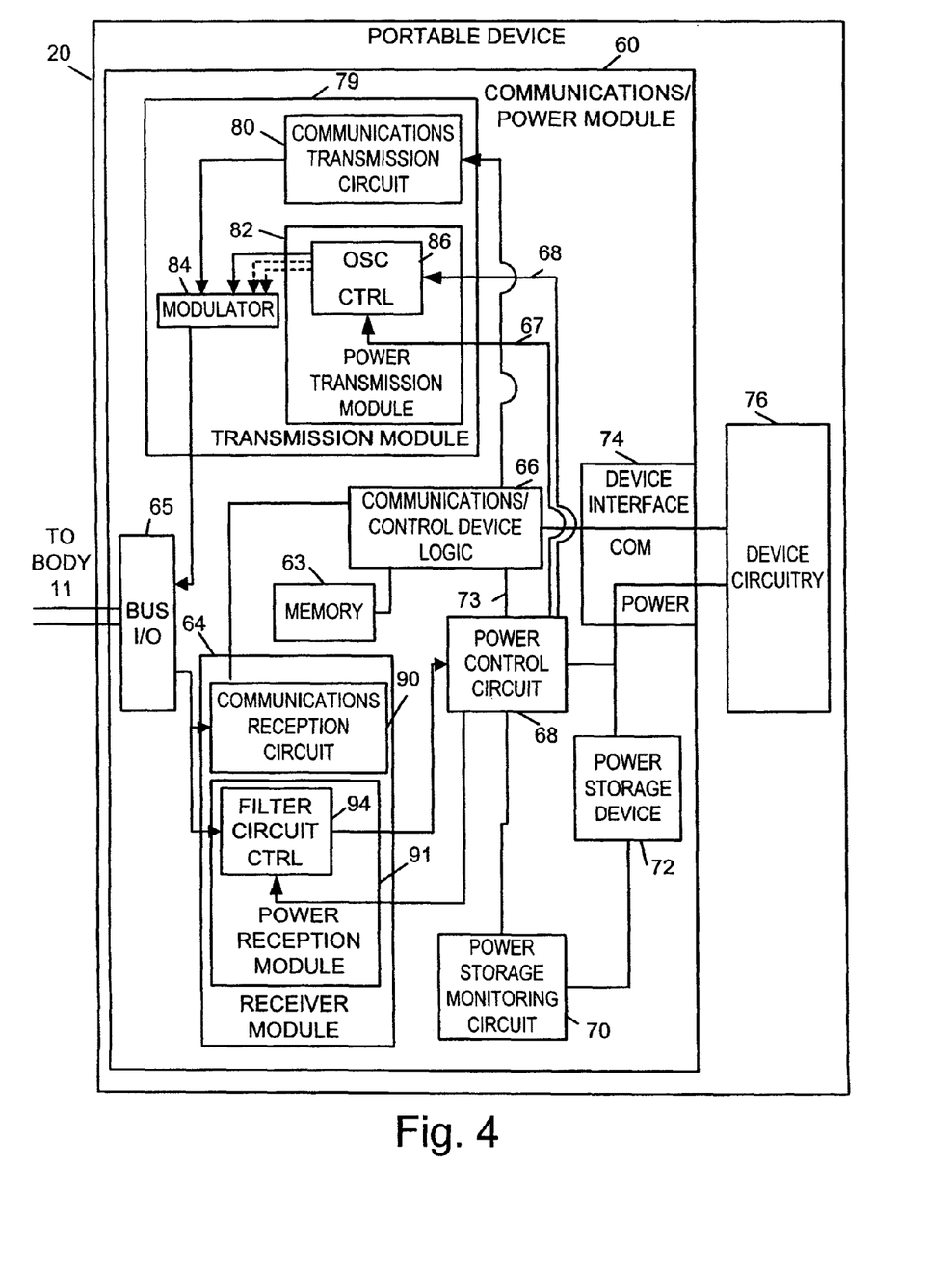
FIG. 4 illustrates an exemplary portable device implemented in accordance with the present invention.

The piezo electric speaker 30 is responsive to electrical signals in part of the audio frequency range. Thus, the electrical audio frequency signals applied to the body 11 via the pager 22 are converted into acoustic signals which a user of the system 10 can hear. Since the electrical audio signals are transmitted via the body to the speaker 29, the signals cannot be easily intercepted or detected by people or devices located nearby. Furthermore, by mounting the speaker 29 in or near the user's ear, the possibility of acoustic audio signals being overheard is also minimized. Accordingly, the system of the present invention allows a user to receive and hear audio messages in a manner which is difficult to detect by nearby individuals and which therefore can be used even during meetings FIG. 4 is a block diagram of the first portable device 20, wherein the components of the communications power module are shown in detail. As previously discussed, the portable device 20 includes a communications/power module 60 and device circuitry 76.

The communications/power module includes a transmission module 79, a receiver module 64, bus interface circuit 65, memory 63, communications/control device logic 66, device interface 74, power control circuit 68, power storage device 72, and power storage monitoring circuit 70.

The bus interface 65 is responsible for interfacing between the body 11 that is used as a power and communications bus, and the circuitry of the communications/power module 60. Accordingly, both power and information signals are transmitted and received through the bus interface 65. Device interface 74 is responsible for coupling components of the communications/power module to device circuitry 76. The device interface 74 includes both an information, e.g., communications (COM) interconnect and a power interconnect. Device interface 74 may be standardized, e.g., using a common connector, to allow a plurality of different device circuits 76 to be used with the same device interface 74.

Communications/control device logic 66 may be implemented using a CPU that executes one or more control routines. The control routines and other data are stored in memory 63 that is coupled to the device logic 66.

In addition to being coupled to memory 63, the device logic 66 is coupled to the transmission module 79. By way of the transmission module 79, the device logic can transmit signals via the bus 11. The device logic 11 is also coupled to the receiver module 64, power control circuit 68, and the communication port of the device interface 74. The connection to the receiver module 64 allows the device logic 66 to receive signals from the bus 11. Such signals may be identification, control signals and/or other information transmitted by another portable device coupled to the bus 11. The connection to the power control circuit 68 allows the device logic 68 to receive power consumption information, power storage status information, and power requirement information from the power control circuit 68 and to send signals to the power control circuit 68 regarding charging information and power transmission information. For example, the device logic can indicate to the power control circuit the time period during which the power storage device 72 is to be charged from power obtained via the bus 11 and the frequency at which the power signal will be transmitted. Similarly, when being used to supply power to the bus 11, the control device logic 66 can indicate to the power control circuit 68 the time period in which power is to be supplied to the bus 11 and the frequency of the signal to be used to supply the power.

Through the connection with the device interface 74, communications/control logic 66 can receive and exchange information and other signals with the device circuitry 76. Thus, communications/control logic 66 can be used to oversee the exchange of information between device circuitry 76 and other devices coupled to the bus 11.

The power control unit 68 is coupled to the communications control device logic 66, power storage monitoring circuit 70, power storage device 72, power port of device interface 74, and control inputs of the transmission module 79 and receiver module 64.

Power usage and battery status is monitored by the power storage monitoring circuit 70. Information relating to power usage and battery status is then supplied by the power storage monitoring circuit 70 to the power control circuit 68. From this information, the power control circuit 68 can determine when the power storage device 72 will need to be recharged and/or when there is sufficient power in the power storage device 72 to power other devices coupled to the bus 11.

Power control circuit 68 is coupled to power storage device 72. Thus, power can be supplied from the power storage device 72 to the power control circuit 68, e.g., for purposes of powering other devices or attached circuitry. In addition, power control circuit 68 can supply power to the power storage device 72, e.g., to recharge batteries included in the power storage device 72.

Power control circuit 68 has power outputs coupled to the power terminal of device interface 74 and to a power input of the transmission module 79. Accordingly, power control circuit 68 can supply power to the device circuitry 76, coupled to device interface 74 and/or to transmission module 79 for transmission via bus 11 to other devices.

An information and control line 73 couples the communications/control device logic 66 to the power control circuit 68. Via line 73, power consumption availability and other power related information can be supplied to the device logic 66. In addition, communications/control device logic can instruct the power control circuit 68 when, and at what transmission frequency, power is to be supplied to one or more devices coupled to the bus 10. The communications/control device logic 66 can also instruct the power control circuit 68 when, and at what transmission frequency, power is to be received via the bus 11, e.g., for purposes of recharging power storage device 72 and/or for powering device circuitry 76.

Power control circuit 68 has a receiver control signal output coupled to the receiver module for transmitting a control signal used to indicate the frequency at which power is to be supplied to the portable device 20 via bus 11. Power control circuit 68 also has a power transmission control signal output, coupled via bus 67, to the transmission module for transmitting a frequency control signal used to indicate the frequency at which power is to be supplied to one or more portable devices coupled to the bus 11.

Transmission module 79 comprises a communications transmission circuit 80 and a power transmission module 82. The power transmission module 82 is a signal generator circuit capable of producing one or more power supply signals of different frequencies with signals of different frequencies being used to supply power to different devices coupled to the bus 11 during the same or different time periods. In order to generate the power supply signals, the power transmission module includes one or more controllable oscillators 86. Each oscillator 86 is responsive to the frequency control signal supplied by the power control circuit 68 to generate a signal have a frequency specified by the control signal. Power is supplied to an input of the controllable oscillator 86 is by the power control circuit 68 via bus 75. The input voltage to OSC 86 may be a DC voltage in the range of, e.g., 3-200 volts. While relatively high voltages can be safe assuming low currents, they can be felt by the user of the system. Accordingly, in order to minimize the sensation resulting form the transmission of signals over the body, power supply and communication signals may be limited to under 100 volts. The oscillator 86 generates either a pulsed DC signal or an AC signal having a frequency determined by the received frequency control signal.

In the case of a pulsed DC signal, power control circuit 68 can also supply a period duration signal indicating the duration of a pulse is to be asserted, e.g., on during the signal period determined by the frequency control signal. Thus, pulse duration, e.g., duty cycle, can be used to finely adjust the amount of power supplied to a device coupled to the bus 11, while the frequency of the power signal can be used to control which device or devices will be supplied with power during a given time period. The power signal generated by the oscillator 86 is supplied to a first input of the modulator 84.

Communications transmission circuit 80 receives from the communications/control device logic information to be transmitted to other devices coupled to the bus 11. The information may include, e.g., power supply information, initialization information, and/or information to be used by device circuitry included in one or more devices on the bus 11. The communications transmission circuit 80 places the information to be transmitted into a format that is used for transmission of data over the bus 11. The formatted information is then supplied to a second signal input of modulator 84. Modulator 84 modulates the information to be transmitted onto the power transmission signal output by the power transmission module 82. In the event that a power transmission signal is not being supplied to the bus, or as an alternative to modulating the information signal on the power signal, the information signal output by the communications transmission circuit may be supplied directly to bus 11.

Any one of a plurality of known modulation techniques may be used for this purpose. For example, frequency modulation (FM) or amplitude modulation (AM) may be used by the modulator 84. The modulated signal, which includes the information to be transmitted, generated by the modulator 84, is supplied to the bus 11 via bus interface 65.

Initialization information, transmitted by the transmission module 79, may include device identification information, power requirement information, power supply capability information, and other device capability information. Control signals may be exchanged between devices on the bus 11 whenever a device is added to the bus 11, e.g., placed on the body, and periodically thereafter to determine when a device has been removed from the bus 11. As part of the device initialization process, a master/slave relationship is set up between devices on the bus 11 with, e.g., one of the devices acting as the bus and power control master. In one embodiment, the first device added to the bus 11 with the communications/power module 60 required servers as the master with later added devices acting as slaves. With the removal of the master device from the bus 11, the devices remaining on the bus repeat the initialization process and select another device to serve as the master.

Assuming at least one power source is present at any given time or the devices have sufficient stored power to operate without power from the bus 11, devices can be added and removed from the bus 11 periodically without an interruption in device operation. Thus, new power sources can be added to replace existing power sources without any interruption in the services being provided by the devices coupled to the bus 11.

Power and information reception by the communications/power module 60 will now be described. The receiver module 64 includes a communications reception circuit 90, and a power reception module 91. The communications reception circuit 90 is a demodulator circuit, which demodulates the signal received from the bus 11 to produce the transmitted information signal. The information signal generated by communications reception circuit 90 is supplied to communications/control device 66 which can identify, e.g., based on device identification information included in the information signal, information directed to the portable device 20.

Power reception module 91 includes a controllable filter circuit 94. The controllable filter circuit 94 may be implemented as a pass band filter which can be set to pass the frequency used to supply power to the portable device 20 while rejecting other frequencies. The filter 94 is responsive to a power reception frequency control generated by the power control circuit 68. By setting different devices to receive power at different frequencies different devices can be powered at the same time over the bus 11 via one or more power supply signals of different frequencies. Accordingly, multiple power supply devices and power sinks can be coupled to the bus 11 at the same time with power being supplied and received in a selective manner as a function of the frequency of the signals used to transmit the power.

Figure 5:
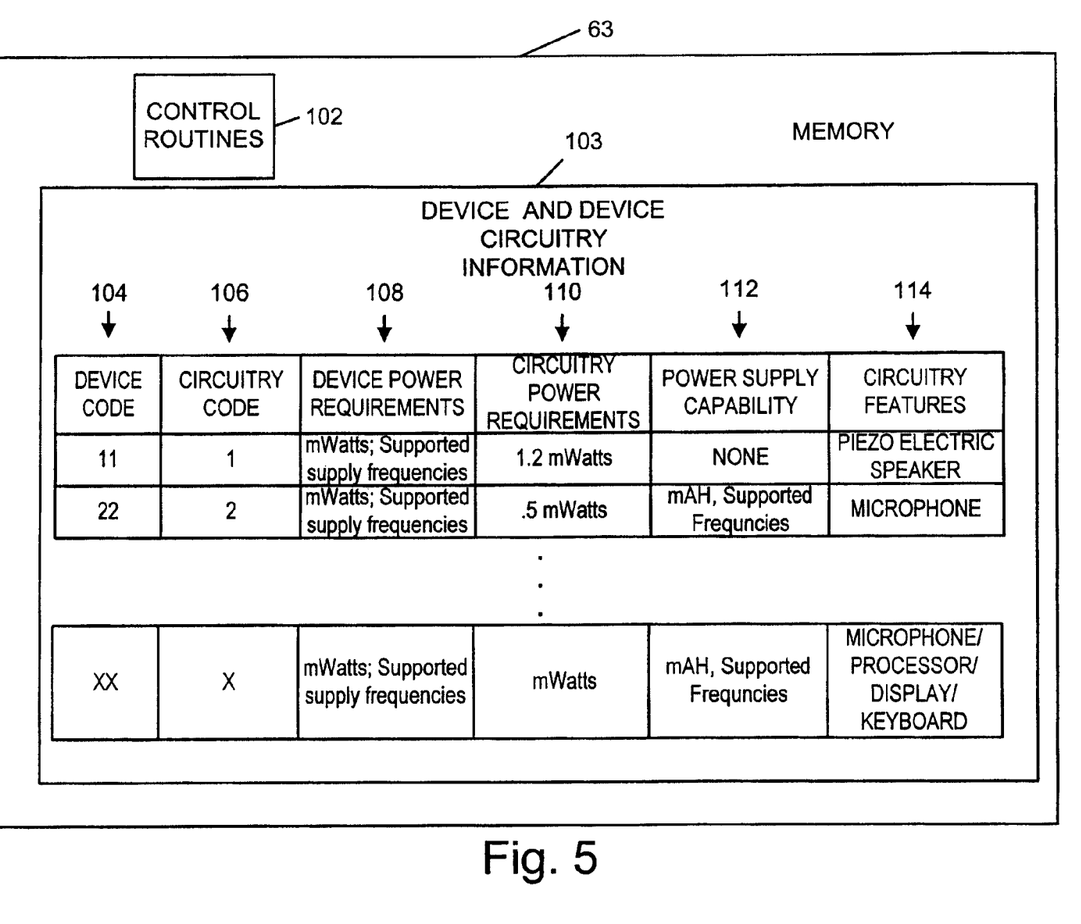
FIG. 5 illustrates the contents memory included in a communications/power module implemented in accordance with the present invention.

FIG. 5 illustrates the memory 63 of the device 20 in greater detail. As illustrated the memory includes control routines 102, and a set of data 103 indicating the capabilities and power requirements of various devices that may be coupled together by the bus 11. In the data set 103, each row corresponds to a different device. The device is identified in the first column 104 of each row by a unique device identifier. In the illustrated example, the device code is a two digit number. In the second column 106, a circuitry code is stored indicating the type of device circuitry 60 included in the particular device identified in the first column. In the third column 108 device power requirement information is stored. The stored information includes, e.g., the power required by the device and the frequencies of a power supply signal which may be used to supply the power to the device using the body as a bus. The forth row 110 indicates the power requirements of the circuitry 60 included in the particular device. This number will normally be lower than the total device power requirements listed in column 8. The fifth column 112 includes information on the ability of the device identified in the first column to supply power to other devices coupled to the bus 11. As illustrated, some devices do not support the ability to supply power supply capability. For those devices that can supply power to other devices, the total amount of power available for use is listed and the frequencies of the power supply signals which can be generated by the device are listed. The last column 114 of the data 103 lists the particular features/capabilities of the device identified in column 1. For example, device identified by code 11 has a piezo electric speaker while device XX listed in the last row of has a microphone, processor, display and keyboard.

The device power and capabilities information can be used by the communications/control device logic 66, when operating as a master, to determine how best to supply the various devices coupled to the bus 11 with power. The use of device codes and look-up table information minimizes the amount of initialization and device identification/power requirement information that must be exchanged between the devices coupled to the bus 11.

As discussed above, in one embodiment, the device that is coupled to the bus first serves as a master device with the later added devices serving as slaves. When a master device leaves the network, e.g., is removed from the body, another one of the devices takes over as the master insuring orderly distribution of power and communication signals.

Figure 6:
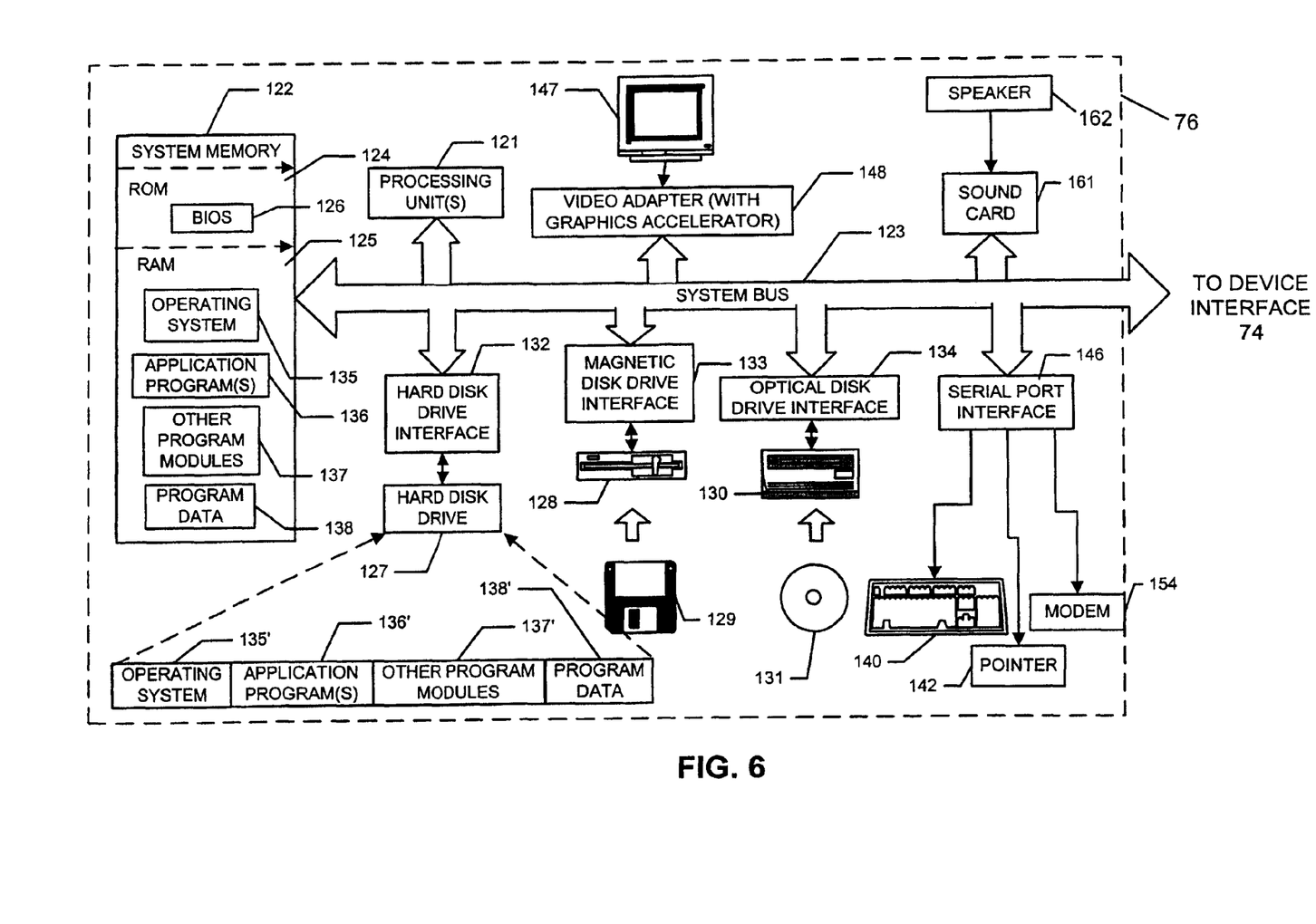
FIG. 6 illustrates device circuitry, which may be used to implement a portable computer system coupled to a body in accordance with the present invention.

FIG. 6 illustrates exemplary device circuitry 76 of the portable device 20 in detail. The device circuitry 76 represents circuitry used to implement a portable computer system or PDA.

With reference to FIG. 6, it can be seen that exemplary device circuitry 76 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system bus 123 is used for distributing both information and data, e.g., using one or more separate lines. The system bus 123 is coupled to device interface 74 allowing the device circuitry 76 to receive power from and communicate with communications/power module 60.

The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The device circuitry 76 may also include a hard disk drive 127 for reading from and writing to a hard disk (not shown), a magnetic disk drive 128 for reading from or writing to a (e.g., removable) magnetic disk 129, and an (magneto) optical disk drivel 30 for reading from or writing to a removable (magneto) optical disk 131 such as a compact disk or other (magneto) optical media. The hard disk\drive 127, magnetic disk drive 128, and (magneto) optical disk drive 130, may be coupled with the system bus 123 by a hard disk drive interface 132, a magnetic disk drive interface 133, and a (magneto) optical drive interface 134, respectively. The drives and their associated storage media provide non-volatile storage of machine-readable instructions, data structures, program modules and other data for the personal computer 120. Although the exemplary environment described herein employs a hard disk, a removable magnetic disk 129 and a removable (magneto) optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135, one (1) or more application programs 136, other program modules 137, and/or program data 138 for example. A user may enter commands and information in to the device circuitry 76 through input devices, such as a keyboard 140 and pointing device 142 for example. Other input devices (not shown) such as a microphone, joystick, game pad, satellite dish, scanner, or the like may also be included. These and other input devices are often connected to the processing unit 121 through a serial port interface 146 coupled to the system bus. However, input devices may be connected by other interfaces, such as a parallel port, a game port or a universal serial bus (USB) or, in accordance with the present invention, through communications/power module 60 which is coupled to various devices via bus 11. A monitor 147 or other type of display device may also be connected to the system bus 123 via an interface, such as a video adapter 148 for example. In addition to the monitor, the device circuitry may include other peripheral output devices (not shown), such as speakers and printers for example.

The circuitry 76 is designed to operate in a networked environment that defines logical connections to one (1) or more remote devices, such as remote devices 24, 26, 27, 30. In a networked environment, at least some of the program modules depicted relative to the device circuitry 76 may be stored in a remote memory storage device. The network connections shown are exemplary and other means, e.g., modems, of establishing a communications link between the device circuitry 76 and other devices may also be employed.

While the above system has been described as a network of devices coupled to a single body it is to be recognized that the network can be extended by connecting multiple bodies through physical contact, e.g., touching hands as part of a handshake. When two or more bodies are connected physically, the linked bodies form one large bus over which power and/or communications signals can be transmitted. When two or more bodies are connected physically, the power and/or communications signals can be transmitted across at least two living beings. Furthermore, a first device in a network of devices may be located on a first living being and a second device in the network of devices may be located on a second living being.

In addition, the physical resistance offered by the human body can be used in implementing a keypad or other input device as well as estimating distances between devices and device locations. In accordance with the present invention, by varying the distance on the skin between the contacts corresponding to different keys, different signal values can be generated representing different inputs.

The relative distances between devices coupled to a body can be estimated based on the strength of a device's transmit signals as compare to the strength of the receive signals detected by a device. If the location of the master device is known, then the master can estimate the location of peripherals on the body. This information is used in accordance with various embodiments of the present invention by the communications/control device logic when controlling the power of broadcasted signals. Broadcast signal power is reduced when the device to which the signal is being transmitted is in close proximity to the broadcasting signal source and increased when the device is relatively distant from the broadcasting signal source. Thus power usage can be optimized to minimize wastage. In one particular embodiment, the voltage of a signal transmitted by a first device and received by a second device over a body is measured by the second device to determine the strength of the received signal. The output voltage and/or duty cycle of signals transmitted from the second device to the first device are then adjusted as a function of the measured signal voltage. The power control circuit 68 of a portable device is used to perform the received signal voltage measurement and to control the output voltage/duty cycle control operation. To perform these function the control circuit 68 may include voltage measurement circuitry, e.g., volt meter, and control logic. Normally a low measured voltage, indicative of a relatively large distance between the first and second devices, will result in the second device transmitting a signal to the first device with a higher output voltage or duty cycle than when a higher voltage is measured in regard to a signal received from the first device. In accordance with another feature of the present invention, devices can initialize differently depending on location. For example, a speaker located near the ear can convey its location so that it will be supplied with less power than a speaker further away from the ear, e.g., a speaker located on the waist or arm. Accordingly, the transmission of device location information as part of a device initialization process that occurs after a device is placed on the body is contemplated and implemented in various exemplary embodiments.

Various exemplary embodiments have been described above. In view of the description provided above, various modifications will be apparent to those skilled in the art without deviating from the inventive teachings described and claimed herein. For example, it will be apparent that the body may be that of a wide variety of living animals and need not be limited to being a body of a human being.

What is claim is:

1. A system that facilitates reduction of wiring in connection with networking portable devices, comprising:
    a plurality of devices that are electrically networked together via a human body, which serves as a transmission medium for at least a subset of the devices, a power signal having an information signal modulated on the power signal is transmitted between the subset of the devices through the human body, wherein one of the plurality of devices that receives the power signal includes a filter circuit that allows a signal frequency of the power signal to pass and rejects other frequencies and a demodulator that demodulates the power signal to produce the information signal.

2. The system of claim 1, wherein an audio signal is transmitted between at least some of the subset of the devices through the human body.

3. The system of claim 2, wherein one of the plurality of devices that receives the audio signal comprises a piezo electric speaker with leads coupled directly to the human body.

4. The system of claim 1, wherein a digital signal is transmitted between at least some of the subset of the devices through the human body.

5. The system of claim 1, wherein an analog signal is transmitted between at least some of the subset of the devices through the human body.

6. The system of claim 1, wherein at least one of the devices is a set of electronic earrings.

7. The system of claim 6, wherein the earrings measure functions of the human body.

8. The system of claim 1, wherein one of the plurality of devices comprises a kinetic converter.

9. The system of claim 1, wherein at least one of the plurality of devices comprises electrodes that are placed in physical contact with the human body.

10. The system of claim 1, wherein at least one of the plurality of devices comprises footwear worn on the human body, the footwear comprising a kinetic converter configured to generate power sent through the power signal.

11. The system of claim 1, wherein a control signal indicates an oscillation frequency at which the power signal is transmitted between the subset of the devices.

12. The system of claim 1, wherein a pulse duration of the power signal is used to adjust an amount of power supplied to one or more of the plurality of devices.

13. The system of claim 1, wherein one of the plurality of devices acts as a power control master device.

14. The system of claim 13, wherein the plurality of devices other than the power control master device act as slave devices.

15. A portable computing device, comprising:
a pair of electrodes that electrically couples the device to skin of a living body, the pair of electrodes in physical contact with the skin of the living body;
an oscillator that outputs a transmitted information signal having a frequency determined by a frequency control input signal;
a modulator that modulates a power transmission signal to encode the transmitted information signal onto the power signal, the power transmission signal transmitted through the pair of electrodes;
a demodulator that demodulates a received signal to produce a received information signal, the received signal received through the pair of electrodes; and
a filter circuit that allows a signal frequency which supplies power to the portable device to pass and rejects other frequencies.

16. A method for transmitting signals, comprising:
generating a power supply signal with a first device;
encoding, by a modulator of the first device, an information signal on the power supply signal;
transmitting the power supply signal encoding the information signal through living tissue;
using a second device to receive the transmitted power supply signal encoding the information signal; and
demodulating, by a demodulator of the second device, the transmitted power supply signal encoding the information signal to produce the information signal.

17. The method of claim 16, wherein the second device is located within the living tissue.

18. The method of claim 17, wherein the first device is located outside the living tissue.

19. The method of claim 16, further comprising transmitting the signal upon request from the second device.

20. The method of claim 16, further comprising increasing amplitude of the signal to facilitate employment of the signal by the second device.

21. The method of claim 17, wherein the second device comprises a speaker located within the living tissue of an ear.

22. The method of claim 16, further comprising sending the signal as a power supply upon detection of low power status of the second device.

23. The method of claim 16, further comprising transmitting the signal across at least two living beings.

24. The method of claim 23, wherein the first device is located on a first living being and the second device if located on a second living being.

25. The portable computing device of claim 15, wherein the oscillator outputs the transmitted information signal as a square wave signal.

26. The portable computing device of claim 15, wherein the oscillator outputs the transmitted information signal as a sine wave signal.

27. The portable computing device of claim 15, wherein the information signal is modulated on the power signal using amplitude modulation of the power signal.

28. The portable computing device of claim 15, wherein the information signal comprises an analog signal encoding audio information.

29. The portable computing device of claim 28, wherein the audio information is converted directly into an acoustic audio signal by a piezo electric element of a speaker.

30. The method of claim 16, wherein the first device comprises a kinetic converter.

31. The method of claim 16, wherein the first device comprises footwear including a kinetic converter.

32. The method of claim 16, further comprising filtering, by a filter circuit of the second device, received signals such that a signal frequency of the power supply signal is allowed to pass and other frequencies are rejected.

* * * * *